US010380629B2

(12) United States Patent
Amin et al.

(10) Patent No.: US 10,380,629 B2
(45) Date of Patent: Aug. 13, 2019

(54) LEVERAGING A SOCIAL GRAPH TO DELIVER RELEVANT RECOMMENDATIONS

(71) Applicant: Microsoft Technology Licensing, LLC, Redmond, WA (US)

(72) Inventors: Mohammad Shafkat Amin, Cupertino, CA (US); Baoshi Yan, Mountain View, CA (US); Sripad Sriram, San Francisco, CA (US); Anmol Bhasin, Mountain View, CA (US); Christian Posse, Forster City, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 285 days.

(21) Appl. No.: 13/889,991

(22) Filed: May 8, 2013

(65) Prior Publication Data
US 2013/0318180 A1 Nov. 28, 2013

Related U.S. Application Data

(60) Provisional application No. 61/652,003, filed on May 25, 2012.

(51) Int. Cl.
*G06Q 30/02* (2012.01)
*G06Q 30/06* (2012.01)
*G06Q 50/00* (2012.01)

(52) U.S. Cl.
CPC ..... *G06Q 30/0251* (2013.01); *G06Q 30/0253* (2013.01); *G06Q 30/0254* (2013.01);
(Continued)

(58) Field of Classification Search
CPC ........... G06Q 50/01; G06Q 10/10–109; G06Q 30/0607–0631; G06Q 10/06375;
(Continued)

(56) References Cited

U.S. PATENT DOCUMENTS 8,386,406 B2 * 2/2013 Bolivar ............... G06N 5/02
706/46
8,700,599 B2 * 4/2014 Udupa ............... G06F 16/3334
707/709
(Continued)

OTHER PUBLICATIONS

BusinessWire article, "7 Degrees Announces Major Upgrade of PeopleMapsTM Business Relationship Analysis Tool" published on www.businessWire.com on Feb. 24, 2011.*
(Continued)

*Primary Examiner* — Wing F Chan
*Assistant Examiner* — Rajeshwari Krishnan
(74) *Attorney, Agent, or Firm* — Schwegman Lundberg & Woessner, P.A.

(57) ABSTRACT

Techniques for leveraging a social graph to facilitate the delivery of relevant recommendations. For example, a recommender is identified based on the recommender being a member of a social networking service who has interacted with an item of web-based content. A recommendee is identified based on the recommendee being another member of the social networking service who is connected to the recommender via a social graph maintained by the social networking service and based on having an affinity score for the item that exceeds a recommendee affinity score threshold and a connection strength to the recommender that exceeds a connection strength threshold. The recommender is sent a communication that invites the recommender to recommend the item to the recommendee. With some example embodiments, the communication is sent to the recommender within a pre-determined time measured from the time the recommender initiated an interaction with the item of web-based content.

20 Claims, 6 Drawing Sheets

(52) U.S. Cl.
CPC ..... *G06Q 30/0269* (2013.01); *G06Q 30/0631* (2013.01); *G06Q 50/01* (2013.01)

(58) Field of Classification Search
CPC ........ G06Q 30/02–0282; H04L 65/403; H04L 51/34; H04L 67/22; H04L 67/306; G06F 17/30–30964; G06F 17/30867; G06F 17/3053–30554; G06F 17/30029–30964; H04N 21/4826–4828
See application file for complete search history.

(56) References Cited

U.S. PATENT DOCUMENTS

| | | | | |
|---|---|---|---|---|
| 8,825,785 | B1* | 9/2014 | Shah | G06Q 10/107 709/204 |
| 9,824,406 | B1* | 11/2017 | Curtis | G06Q 30/0282 |
| 9,886,711 | B2* | 2/2018 | Deshpande | G06Q 30/0631 |
| 10,157,371 | B2* | 12/2018 | Narayanan | G06Q 50/01 |
| 10,169,476 | B2* | 1/2019 | Liu | G06Q 10/10 |
| 2007/0143281 | A1* | 6/2007 | Smirin | G06F 16/9535 |
| 2010/0076850 | A1* | 3/2010 | Parekh | G06Q 30/0269 705/14.66 |
| 2010/0094863 | A1* | 4/2010 | Kenton-Dau | G06Q 10/06375 707/722 |
| 2011/0289433 | A1* | 11/2011 | Whalin | G06F 17/30964 715/753 |
| 2012/0158715 | A1* | 6/2012 | Maghoul | G06F 17/30867 707/728 |
| 2012/0166532 | A1* | 6/2012 | Juan | G06Q 50/01 709/204 |
| 2013/0031090 | A1* | 1/2013 | Posse | G06F 17/30867 707/723 |
| 2013/0117675 | A1* | 5/2013 | Twig | G06F 17/30867 715/737 |
| 2013/0159110 | A1* | 6/2013 | Rajaram | G06Q 50/01 705/14.66 |
| 2013/0166721 | A1* | 6/2013 | Soffer | H04L 51/32 709/224 |
| 2013/0275179 | A1* | 10/2013 | Marshall | G06Q 30/0214 705/7.29 |
| 2013/0290109 | A1* | 10/2013 | Jamal | G06Q 50/01 705/14.66 |
| 2014/0012925 | A1* | 1/2014 | Narayanan | G06Q 10/109 709/206 |
| 2014/0025743 | A1* | 1/2014 | Chou | H04L 67/22 709/204 |
| 2014/0047023 | A1* | 2/2014 | Baldwin | G06Q 10/10 709/204 |
| 2014/0067967 | A1* | 3/2014 | Jackson | G06Q 50/01 709/206 |
| 2014/0143050 | A1* | 5/2014 | Boland | G06Q 50/01 705/14.53 |

OTHER PUBLICATIONS

"Collaborative filtering", Wikipedia, [Online]. Retrieved from the Internet: <URL: http://en.wikipedia.org/wiki/Collaborative_filtering, (Accessed Jul. 23, 2015), 10 pgs.

Geyer, Werner, et al., "Recommending topics for self-descriptions in online user profiles", In RecSys '08: Proceedings of the 2008 ACM conference on Recommender systems, ACM, 2008., (2008), 8 pgs.

Groh, Georg, et al., "Recommendations in taste related domains: collaborative filtering vs. social filtering", In GROUP '07: Proceedings of the 2007 international ACM conference on Supporting group work, ACM, 2007., (2007), 10 pgs.

Guy, Ido, et al., "Do you know?: recommending people to invite into your social network", IUI '09: Proceedings of the 13th international conference on Intelligent user interfaces, (2009), 10 pgs.

Kautz, Henry, et al., "Referral Web: combining social networks and collaborative filtering", Commun. ACM, 40(3):63-65, (Mar. 1997), 4 pgs.

Kempe, David, et al., "Maximizing the spread of influence through a social network", In Proceedings of the ninth ACM SIGKDD international conference on Knowledge discovery and data mining, KDD '03, ACM, 2003., (2003), 10 pgs.

Kleinberg, Jon, "Cascading Behavior in Networks: Algorithmic and Economic Issues", Cambridge University Press, (2007), 20 pgs.

Lerman, Kristina, "Social Networks and Social Information Filtering on Digg", (Dec. 2006), 8 pgs.

Sinha, Rashmi, et al., "Comparing Recommendations Made by Online Systems and Friends", In in Proceedings of the DELOS-NSF Workshop on Personalization and Recommender Systems in Digital Libraries, 2001., (2001), 6 pgs.

* cited by examiner

LEVERAGING A SOCIAL GRAPH TO DELIVER RELEVANT RECOMMENDATIONS

RELATED APPLICATION

This application claims the priority benefit of U.S. Provisional Patent Application No. 61/652,003, filed May 25, 2012, which is incorporated herein by reference in its entirety.

TECHNICAL FIELD

The present disclosure generally relates to data processing systems. More specifically, the present disclosure relates to methods, systems, and computer program products that leverage a social graph to identify senders and recipients of relevant recommendations and to facilitate the delivery of the relevant recommendations from the senders to the recipients.

BACKGROUND

Many online businesses make recommendations of their products to online users in the hope that the recommendation recipients follow the recommendations. A recommendation is effective if the recommendation recipient (hereinafter also "recommendee") acts on the recommendation. However, the more recommendations are sent to online recommendees, the less effective the recommendations may become. In other words, an increased volume of recommendations received by recommendees may cause the recommendees to become annoyed and ignore the recommendations.

Some online businesses have made attempts to create recommendations that are more effective by including social signals into the recommendations. A recommendation that includes social signals usually makes a reference to a member of the recommendee's social network in an attempt to make the recommendation seem more personal and, therefore, more acceptable to the recommendee.

In a traditional recommendation system, a content provider communicates a recommendation to a target user (also "recommendee"). The content provider directly delivers information about an item (e.g., product, article, service, etc.) to a recommendee via email or online notification streams (e.g., Facebook® Wall™). Any interaction by a member of the recommendee's social network with this item is primarily used as a social proof to enhance the credibility of the recommendation. For example, the content provider may utilize knowledge derived from a recommendee's social graph to indicate that a member of the recommendee's social graph has already used, interacted with, or liked an item of web-based content (also "item"). A "social graph" is a mechanism used by online social network services for defining and memorializing, in a digital format, a user's relationships with other people. Frequently, a social graph is a digital representation of real-world relationships. Social graphs may be digital representations of online communities to which a user belongs, often including the members of such communities (e.g., a family, a group of friends, alums of a university, employees of a company, members of a professional association, etc.)

As discussed above, some online businesses may include in a recommendation to the recommendee a reference to a member of the recommendee's social network in order to enhance the credibility of the recommendation. Such recommendations delivered by a content creator (e.g., an e-commerce site) directly to a target user are also known as "cold" recommendations due to their impersonal nature or unrelatable source. Accordingly, because the vast majority of such "cold" recommendations are likely to annoy the recipients and, as a result, be ignored, the conventional social signal recommendations are generally ineffective in accomplishing their purpose of engaging the recommendation recipient with the recommended item.

DESCRIPTION OF THE DRAWINGS

Some embodiments are illustrated by way of example and not limitation in the FIGs. of the accompanying drawings, in which.

DETAILED DESCRIPTION

Figure 1:
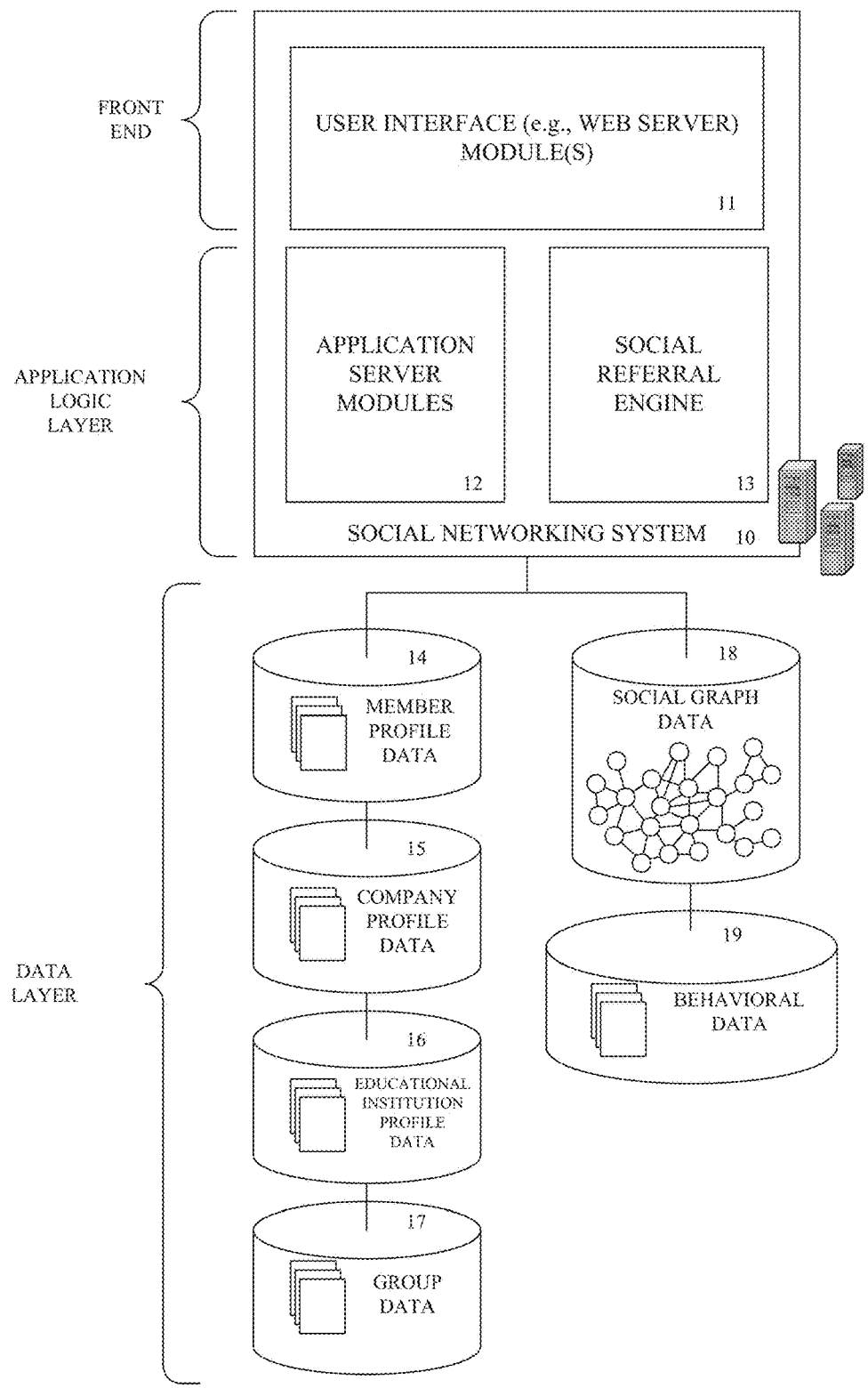
FIG. 1 is a block diagram illustrating various functional components of a social network system with a social referral engine, consistent with some example embodiments, for use with a wide variety of applications, and specifically for identifying a recommender and a recommendee within the recommender's social graph and for inviting the recommender to refer a relevant item of web content to the recommendee.

The present disclosure describes methods, systems, and computer program products that identify meaningful relationships and associations within a social graph of a social network service to facilitate recommendations. An improved recommendation system may leverage a social graph of a social network service to facilitate the delivery of a relevant recommendation from a trusted recommender (also "referrer") to a recommendee within the recommender's social graph. In the following description, for purposes of explanation, numerous specific details are set forth in order to provide a thorough understanding of the various aspects of different embodiments of the present invention. It will be evident, however, to one skilled in the art, that the present invention may be practiced without all of the specific details and/or with variations permutations and combinations of the various features and elements described herein.

The subject matter described herein may allow a social referral system (also "system") to determine what member of a social networking service may be a suitable recipient of a recommendation and what other member of the social networking service and of the recipient's social graph may be invited to make the recommendation. For purposes of the present disclosure, the terms "social network" and "social network service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks" or "professional networks").

As described above, a social graph may be a digital representation of online communities to which a user belongs, often including the members of such communities. Leveraging a social graph to deliver relevant recommendations from a recommender to a recommendee connected to the recommender via a social graph may be beneficial to the operator of the social referral system, the recommendee, the recommender, and a third party. For example, a member of the social networking service (e.g., the recommender) who is also a content creator may enjoy sharing with his connections (e.g., the members of his social graph) the content that he or she created. A recommendee may derive great benefit from knowing about a group that, for example, may be helpful in finding a new career opportunity. Also, the operator of the social referral system may benefit financially from more users interacting with web-based content. Furthermore, a third party (e.g., an e-commerce business) may derive a financial benefit if, for example, an existing customer makes a new purchase using the e-commerce business based on receiving a recommendation from a member of his social graph.

Previously, attempts have been made to make a recommendation more effective by affecting the perception of the recommendation recipient by attaching social signals to the recommendation. For instance, a recommendation sent to a user may indicate that a user's friend likes the item being recommended. However, because this type of recommendation often comes directly from an impersonal source (e.g., a recommendation system) and not from the user's friend, the recipient is likely to at least ignore the recommendation, if not become annoyed by the "cold" recommendation and possibly sever whatever ties the user may have with the recommendation system. As such, this type of "cold" recommendation is not very effective in accomplishing the goal behind the recommendation: getting the recipient to follow the recommendation. Consistent with some example embodiments, the present disclosure presents a system that may leverage social graph data to propagate relevant recommendations via the members of the social graph based on selectively identifying a subset of their connections to whom the recommendations may be sent. In some example embodiments, the selection process may take into account the affinity of the potential recommendation recipient toward the subject of the recommendation such that potential recipient may be more likely to accept the recommendation.

As discussed above, many of the recommendations delivered to online users today are "cold", unsolicited recommendations that are likely to cause annoyance to the recipients and are, therefore, ineffective in accomplishing their purpose. A "cold" recommendation is a recommendation coming from a system or person to whom the recommendee does not relate (e.g., does not know, is not connected to, has no affiliation with, etc.) A "warm" recommendation is opposite to a "cold" recommendation in the sense that the recommendee has a direct or indirect (but not too far removed) connection (also "association") to the recommender.

In some example embodiments, the subject of the "warm" recommendation may also be relevant to the recommendee in a certain way. In other words, the recommendation may be made based on knowledge that the recommendee has a certain degree of affinity for (e.g., is interested in) the subject of the recommendation. For example, the system may determine that a member of the social networking service has an affinity for a group dedicated to travel based on the member listing travel as one of his personal interests in his or her member profile. Aligning a recommendation with a recommendee's interest (expressed by the recommendee or detected/determined by the recommendation system) may make the recommendation more relevant to the recommendee and, therefore, more effective.

The things that may be the subject of a recommendation are innumerable. In some example embodiments, the recommended items may be items of web-based content. Examples of items of web-based content are an article, a blog posting, an online comment, a web page, a movie, a video clip, an audio file, a photograph, a listing of an item for sale, etc. Other examples of recommended items are a group that may be hosted by the social networking system, an item for sale, a service, or an online identity. Online users may interact with such items by, for example, joining a social networking group, purchasing an item for sale, using a service, writing or sharing a blog entry or a comment, indicating affinity for (e.g., "liking") a web site, watching a movie, following an industry leader's online identity activity, etc. The recommendation system may track which members of the social network system interacted with which items of web-based content to determine, among other things, the potential recommenders (e.g., the people who interacted with items of web-based content, also "recommenders"), the items of web-based content that may be recommended to members who have not interacted with the respective items of web-based content, and the potential recommendees (e.g., the people to whom the recommenders are invited to send recommendations of the items of web-based content, also "recommendees"). Because a recommendation that is relevant to the recipient and originates from a source that has a degree of trust in the eyes of the recipient may be more effective, one of the goals of the social referral system is to determine suitable recommendees for the respective items of web-based content and suitable recommenders for those recommendees. As such, the suitable recommenders may have strong associations with the suitable recommendees and the suitable recommendees may find the respective items of web-based content relevant and the source of the recommendation trustworthy. Accordingly, such recommendations may be positively received and acted upon by the recommendees.

In some example embodiments, upon a user's engagement with an item of web-based content (e.g., watched a movie, read a news article, listened to a music piece, etc.), other users who may potentially be interested in this content are surfaced from the user's network. The social referral system may treat the user as a potential recommender and the other users as potential recommendees. In this model, the content provider (or the social referral system) does not directly engage with the recommendees, but rather "nudges" the recommender to refer this content to the recommender's social ties, for example, by suggesting that the recommender make a recommendation to the recommendees. In some embodiments, the selection process of the referral recipients may be guided by a function of (1) user-item relevance obtained, for example, from the traditional recommendation systems or by a function of (2) user-user connection strength unveiled from the social network (particularly, the social graph maintained by the social network), or both. In this fashion, network ties become effective channels to deliver peer endorsed recommendations (e.g., social referrals).

In various example embodiments, for a particular item of web-based content, using at least one computer processor, the social referral system first may determine a recommender. Then, given the recommender, the system, using the at least one computer processor, may identify a recommendee whom the recommendation forwarded by the recommender may target (e.g., be customized for). A recommender may be determined by tracking the items of web-based content with which members of the social networking service have interacted. A potential recommendee may be determined by analysing the social graph data of the recommender. Example factors that may be considered in selecting a potential recommendee are the connection strength to the recommender and the potential recommendee's affinity score for a particular item of web-based content with which the recommender has interacted. In one example, the strength of the connection between the recommender and the recommendee may be determined based on the distance (e.g., degree of separation) between them in the social graph or based on belonging to a common group, such as alums of a particular university. In another example, the recommendee's affinity score for the item may be determined based on the recommendee's member profile data, social graph data, behavioural data, or collaborative filtering data.

For instance, the social referral system may determine that because user A has joined group X user A may be a potential recommender of the group X. The social referral system may examine the social graph data of user A to find a user B who is not too far removed from user A (e.g., a first or second degree connection) and, therefore, has a strong connection to user A. User B may be a potential recommendee if user B has a certain degree of affinity for group X.

In certain example embodiments, a member of the social networking service is identified as a potential recommendee if his or her connection strength to the recommender is equal or less than a particular degree of separation between the recommender and the member of the social networking service (e.g., between two nodes in a social graph). In other words, the degree of separation between the recommender and another member of the social networking service may determine whether they are a close connection or not. For example, a one-degree separation between a recommender and another member of the social networking service represents a closer connection than a two-degree connection (e.g., a connection via an intermediary member of the social networking service). Accordingly, a first-degree (e.g., direct, without any intermediaries) connection between the recommender and the recommendee has a higher strength than a second-degree connection.

The social referral system may, in some example embodiments, also determine if there is any indication in the social graph data (or any other data) for user A of user's B affinity for group X. For example, the fact that the social graph of user A shows that both users A and B have degrees in marketing from the same university may indicate that user B has a certain degree of affinity for group X which allows marketing professionals to network. Alternately, or in addition, the social referral system may analyse the data available for user B (e.g., member profile data, social graph data, or behavioural data) to determine whether user B has any affinity for group X and if so, of what degree. If it is determined that user B's affinity degree (also "affinity score") is above a certain recommendee affinity score threshold, then user B is considered a potential recommendee and user A is considered a potential recommender. Then, the social referral system may send a communication (e.g., an email message) to user A inviting user A to recommend group X to user B.

The social referral system may, in some instances, determine how strong is a member's affinity toward the item of web-based content before identifying the potential recommender as an actual recommender. A recommender with a high degree of affinity for the item to be recommended may be more likely to forward the recommendation to a recommendee or may be inclined to give a stronger testimonial for the item to be recommended. A recommender affinity score for the item may be calculated based on data available for the potential recommender. For example, a user A who bought a number of clothing items that are red, including a red scarf, has a higher affinity score for the red scarf as compared to a user B who also purchased the red scarf but no other red clothing items. Therefore, in some instances, user A may be identified as a better recommender of the red scarf based on having a higher recommender affinity score for the red scarf.

Then, in the same example, the social referral system may determine who in the social graph of the recommender (e.g., user A) has both a strong connection to the recommender and a strong affinity for scarves, color red, or both, and identify them as recommendees. Next, the social referral system may send a communication to the recommender, user A, that invites user A to recommend the red scarf to the recommendee, user B. By identifying a suitable recommender, a suitable recommendee, an item of common interest to both the recommender and the recommendee, and inviting the recommender to send a recommendation of the item to the recommendee, the system may eliminate the need to send a "cold" and, therefore, ineffective recommendation. As such, the system may not only avoid alienating the recommendee but also may increase the chances of the recommendee interacting with the recommended item (e.g., purchasing the red scarf) based on a positive reaction to the "warm" recommendation rooted in the strong connection to the recommender and the strong affinity for the recommended item.

In some example embodiments, a potential recommendee may be identified based on observing that the potential recommendee exhibited an affinity for (e.g., showed interest in) an item of web-based content that exceeds a certain predetermined threshold. A recommender may be identified based on the recommender being a member of the social networking service who is connected to the recommendee via a social graph maintained by the social networking service, and based on the recommender having interacted with the item and having a connection strength to the recommendee that exceeds a connection strength threshold. As such, in some example embodiments, first a potential recommendee and then a potential recommender may be determined. In other example embodiments, as described above, a potential recommender may be determined before a potential recommendee may be determined. Within a pre-determined time measured from a time the recommendee exhibited the affinity for the item, a communication may be sent to the recommender that invites the recommender to recommend the item to the recommendee.

Consistent with some example embodiments, a recommender may be identified based on the recommender being a member of a group who has initiated an action shared with the group. Examples of actions shared with the group are creating or sharing content relevant to the group (such as an article or news), answering a question asked within the group, forwarding a job lead to the group, etc. In some instances, the group may be hosted by a social networking service. In other instances, the group may not be hosted by the social networking service. A recommendee may be identified based on the recommendee being a member of the social networking service who is connected to the recommender via a social graph maintained by the social networking service and based on having an affinity score for the group that exceeds a recommendee affinity score threshold and a connection strength to the recommender that exceeds a connection strength threshold. Within a pre-determined time measured from the time the recommender initiated the action shared with the group, a communication may be sent to the recommender that invites the recommender to recommend that the recommendee joins the group.

In certain example embodiments, a recommender may be identified based on the recommender being a member of a social networking service who has purchased a unit of an item for sale. A recommendee may be identified based on the recommendee being a person who is another member of the networking service who is connected to the recommender via a social graph maintained by the social networking service and based on having an affinity score for the item for sale that exceeds a recommendee affinity score threshold and a connection strength to the recommender that exceeds a connection strength threshold. Within a predetermined time measured from the time the recommender purchased the unit of the item for sale, a communication may be sent to the recommender that invites the recommender to recommend the item for sale to the recommendee.

Consistent with some example embodiments, the timeliness of the recommendation may play a role. A well-timed recommendation may address a need of the recommendee and provide a benefit to the recommender. A recommender may have an incentive to respond to the request from the recommendation system to send a recommendation to a recommendee if, for example, the recommender has recently written a blog entry and would be interested to receive comments about it from one or more members of his social graph. If the social referral system waits too long to request the recommender to send out a recommendation then the recommender's interaction with the item of web-based content may become stale. There may be little or no benefit to the recommender in forwarding a mistimed recommendation to a recommendee. In some instances, the potential recommender's interaction with the item may become less relevant as time passes and, therefore, the potential recommender may ignore the invitation to recommend if he feels that the request is late. As such, a prompt invitation to recommend sent to a potential recommender is more likely to be acted upon by the potential recommender.

In some example embodiments, the social referral system may establish the time to send the recommendation invitation to the recommendee based on determining the optimal time for the recommendee to send out the recommendation and for the recommendee to respond by following the recommendation. The optimal time may be the time when the recommender or the recommendee, or both, is likely to derive the most benefit from the recommendation. In one example, the social referral system may ask the recommender to make the recommendation right after the recommender purchased an item or after the recommender interacted with an item of web-based content. In another example, the system may send the invitation to recommend soon after the recommender makes a contribution of content to a group on the social networking system. To determine the optimal time, the system may examine any data available for the recommender, the recommendee, and the item of web-based content.

In some example embodiments, the system may pre-select an item to be recommended and pre-determine (e.g., pre-calculate) recommender-recommendee connection strengths and recommendee affinity scores for the item before an interaction with the item by a member of the social networking service occurs and is detected. Upon detecting that a member of the social networking service has interacted with the item, the system may identify the member of the social networking service as a recommender and may invite the recommender to send a recommendation to a suitable recommendee. In certain example embodiments, the system may first detect an interaction by a member of the social networking service with the item and may identify the member as a recommender, and then may calculate the recommender-recommendee connection strength and the recommendee affinity score, and determine that the recommendee score exceeds a recommendee score threshold. In other words, the connection strength and affinity scores may be pre-calculated before an interaction with an item is detected or may be calculated in response to detecting an interaction with an item.

It is to be noted that a member of the social networking service may be a suitable recommendee for a first item that is of high relevance to the member of the social networking service and may not be a suitable recommendee for a second item that is of low or no relevance to the member of the social networking service. Similarly, a recommender may or may not be a suitable recommender for a particular recommendee depending on how close their association (e.g., social graph connection) is. Accordingly, a recommendation of an item of high degree of relevance to the recommendee that originates with a recommender who is closely connected to the recommendee has a better chance of being accepted and of motivating the recommendee to engage with the recommended item.

In certain example embodiments, other factors may also be considered in determining which member of the social networking service may be a good recommender for a particular recommendee or which item to recommend. For example, one such factor is the recency of a member to the social networking service. Where a member is new to the social networking service, the member's affinity measure for certain items may not be known yet. Therefore, a recommendation, for example, to join a group hosted by the social networking service may be based on the recency of the potential recommendee's joining the social networking service as well as any social graph data, profile data, behavior data, or collaborative filtering data available for the potential recommendee.

In some example embodiments, before one or more recommenders are selected from the set of members who interacted with a particular item of web-based content, the potential recommenders may be ranked according to the recommender affinity score for the item or based on other criteria (e.g., who joined a group more recently). Then, those potential recommenders whose affinity score is above a certain recommender affinity score threshold or who rank higher than other members of the social networking service may be selected to receive invitations to recommend the item. Similarly, the potential recommendees may be ranked based on their connection strength to a recommender, based on their recommendee affinity score for the item, or both. Those potential recommendees who score higher may be selected to be presented to the recommender as potential recipients of the recommendation to be made.

In certain example embodiments, the invitation to send a recommendation may be presented to the recommender in a user interface. In some example embodiments, the user interface may also display a graphical representation of at least a part of the recommender's social graph, including a connection path between the recommender and one or more recommendee(s). In certain example embodiments, the recommender may be presented with a communication that includes a recommendation prepared by the social referral system on behalf of the recommender and that asks the recommender to forward the recommendation to the intended recommendee.

FIG. 1 is a block diagram illustrating various functional components of a social network system 10 with a social referral engine 13 for use with a wide variety of applications and specifically for identifying a recommender and a recommendee within the recommender's social graph and for inviting the recommender to refer a relevant item of web content to the recommendee. As shown in FIG. 1, the social network system 10 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social network system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end consists of a user interface module (e.g., a web server) 11, which receives requests from various client-computing devices, and communicates appropriate responses to the requesting client devices. For example, the user interface module(s) 11 may receive requests in the form of Hypertext Transport Protocol (HTTP) requests, or other web-based, application programming interface (API) requests. The client devices (not shown) may be executing conventional web browser applications, or applications that have been developed for a specific platform to include any of a wide variety of mobile devices and operating systems.

As shown in FIG. 1, the data layer includes several databases, including databases 14 for storing data for various entities of the social graph, including member profiles 14, company profiles 15, educational institution profiles 16, as well as information concerning various online or offline groups 17. In addition, the graph data structure is implemented with a graph database 18, which is a particular type of database that uses graph structures with nodes, edges, and properties to represent and store data. Also, included in the data layer is a behavioral database 19 for storing behavioral data for various entities. Of course, with various alternative embodiments, any number of other entities might be included in the social graph, and as such, various other databases may be used to store data corresponding with other entities.

Consistent with some example embodiments, when a person initially registers to become a member of the social network service, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information is stored, for example, in the database with reference number 14. Such information is commonly referred to as "personal profile information", or simply "profile information", and when shown collectively, it is commonly referred to as a member's profile. With certain social network services, such as some business network services, a member's personal information may include information commonly included in a professional resume or curriculum vitae, such as information about a person's education, employment history, job skills, professional organizations, and so forth. With some social network services, a member's profile may be viewable to the public by default, or alternatively, the member may specify that only some portion of the profile is to be public by default. As such, many social network services serve as a sort of directory of people to be searched and browsed.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. In addition to following another member, a user may elect to follow a company, a topic, a conversation, or some other entity, which may or may not be included in the social graph. In some example embodiments, a user's choice to follow another member (or topic, etc.) may be stored as part of behavioural data 19. Examples of other types of relationships that may exist between different entities are direct connections, in the user's address book, in the user's other network(s), attended event, network interaction (e.g., message, share, poll, like, comment, etc.), offsite interaction (e.g., e-mail, direct tweet, re-tweet, etc.), common entity (e.g., company, school, group, organization, etc.), historical (e.g., searched for . . . , viewed profile, viewed content, etc.), common profile attributes or characteristics (e.g., skill, industry, location, specialties, associations, certifications, professional designations, awards, degree, major, minor, etc.), connections at company, alumni at company, recently joined/left company, current/past employer, applied for positions with company, interacted with employee at company, viewing history, in group, group in network, groups being managed, interacted with group content, etc. These and other types of relationships may be represented in the social graph data 18, member profile data 14, behavioural data 19, or any other data.

The social network service may provide a broad range of other applications and services that allow members the opportunity to share and receive information, often customized to the interests of the member. For example, with some embodiments, the social network service may include a photo sharing application that allows members to upload and share photos with other members. As such, at least with some embodiments, a photograph may be a property or entity included within a social graph.

In certain embodiments, the social networking service may facilitate a job recruiter's search for persons who have profiles indicating the possession of certain technical skills, and educational and professional experiences and backgrounds. Similarly, when someone needs to hire a person employed in a particular profession (e.g., a general contractor, a doctor, a lawyer, a landscaper, a plumber, an investment banker, and so forth), that person may turn to a social network service to identify persons who possess the requisite skills and qualifications. In another scenario, a person may desire to contact someone for the purpose of exploring or proposing the possibility of a particular business arrangement or relationship. Accordingly, the person may use a social network service to identify the appropriate persons to contact.

With some embodiments, members of a social network service may be able to self-organize into groups, or interest groups, organized around a subject matter or topic of interest. Accordingly, the data for a group may be stored in database 17. When a member joins a group, his or her membership in the group may be reflected in the social graph data stored in the database with reference number 18. With some embodiments, members may subscribe to or join groups affiliated with one or more companies. For instance, with some embodiments, members of the social network service may indicate an affiliation with a company at which they are employed, such that news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modelled with the social graph data of the database with reference number 18.

According to another example, a member may purchase an item online by interacting with a listing representing an item for sale. The listing representing the item for sale may be created by an e-commerce entity. Data about the purchase and the interaction of the user with the listing and the e-commerce entity are examples of interaction and relationship data that may be stored as part of the behavioural data of the database with reference number 19.

The application logic layer includes various application server modules 12, which, in conjunction with the user interface module(s) 11, generates various user interfaces (e.g., web pages) with data retrieved from various data sources in the data layer. With some embodiments, individual application server modules 12 are used to implement the functionality associated with various applications, services, and features of the social network service. For instance, a messaging application, such as an email application, an instant messaging application, or some hybrid or variation of the two, may be implemented with one or more application server modules 14. Similarly, a search engine enabling users to search for and browse member profiles may be implemented with one or more application server modules 12. Of course, other applications or services that utilize the social referral engine 13 may be separately embodied in their own application server modules 12.

In addition to the various application server modules 12, the application logic layer includes the social referral engine 13. As illustrated in FIG. 1, with some example embodiments, the social referral engine 13 is implemented as a service that operates in conjunction with various application server modules 12. For instance, any number of individual application server modules 12 can invoke the functionality of the social referral engine 13, to include an application server module associated with a messaging application and/or an application server module associated with an application to facilitate the viewing of member social graph connections and their strengths. However, with various alternative example embodiments, the social referral engine 13 may be implemented as its own application server module such that it operates as a stand-alone application. With some embodiments, the social referral engine 13 may include or have an associated publicly available application programming interface (API) that enables third-party applications to invoke the functionality of the social referral engine 13.

Generally, in some example embodiments, the social referral engine 13 takes as input parameters that, at a minimum, identify an item of web-based content and two different nodes corresponding with two entities (e.g., two persons, such as a potential recommender who has interacted with the item and a potential recommendee) in a social graph that is implemented with a graph data structure (e.g., social graph data 18). Using the input parameters, the social referral engine 13 analyses the social graph data 18 to identify the connection paths in the social graph that connect the two entities, if any exist. Additional input parameters may be provided to the social referral engine 13 and used to refine the selection of suitable potential recommendees for presentation to the recommender, for example, as part of an invitation to recommend the item of web-based content to the recommendee. These parameters include, for example, filtering criteria to include or exclude connection paths having a particular strength (e.g., degree of connection between the recommender and the recommendee) or a particular affinity score(s) (e.g., recommender affinity score or recommendee affinity score) for the item of web-based content. In certain example embodiments, the potential recommenders or potential recommendees, or both, may be rated or their connection strength or affinity scores may be compared with particular thresholds to select the suitable potential recommenders or recommendees. Once the social referral engine 13 identifies a potential recommender and one or more recommendees in the social graph of the recommender who satisfy the input parameters, the social referral engine 13 provides the information corresponding with the connection paths to the application that invoked the social referral engine 13 so that an invitation to recommend the item to the recommendee may be sent to the recommender. In some example embodiments, a visual representation of one or more connection paths between the recommender and the recommendee, a prepared recommendation, or both, may be presented to the recommender with the invitation to recommend. In certain example embodiments, the social referral engine 13 may include the functionality that pertains to composing the invitation to recommend or the recommendation, or both.

The social referral engine 13 can be invoked from a wide variety of applications. In the context of a messaging application (e.g., email application, instant messaging application, or some similar application), the social referral engine 13 may be invoked to provide a message sender (e.g., the recommender) with an invitation to recommend the item of web-based content to the message recipient (e.g., recommendee). The invitation may include a visual representation of a connection path between the message sender and the message recipient or a recommendation prepared on behalf of the sender, or both.

Figure 2:
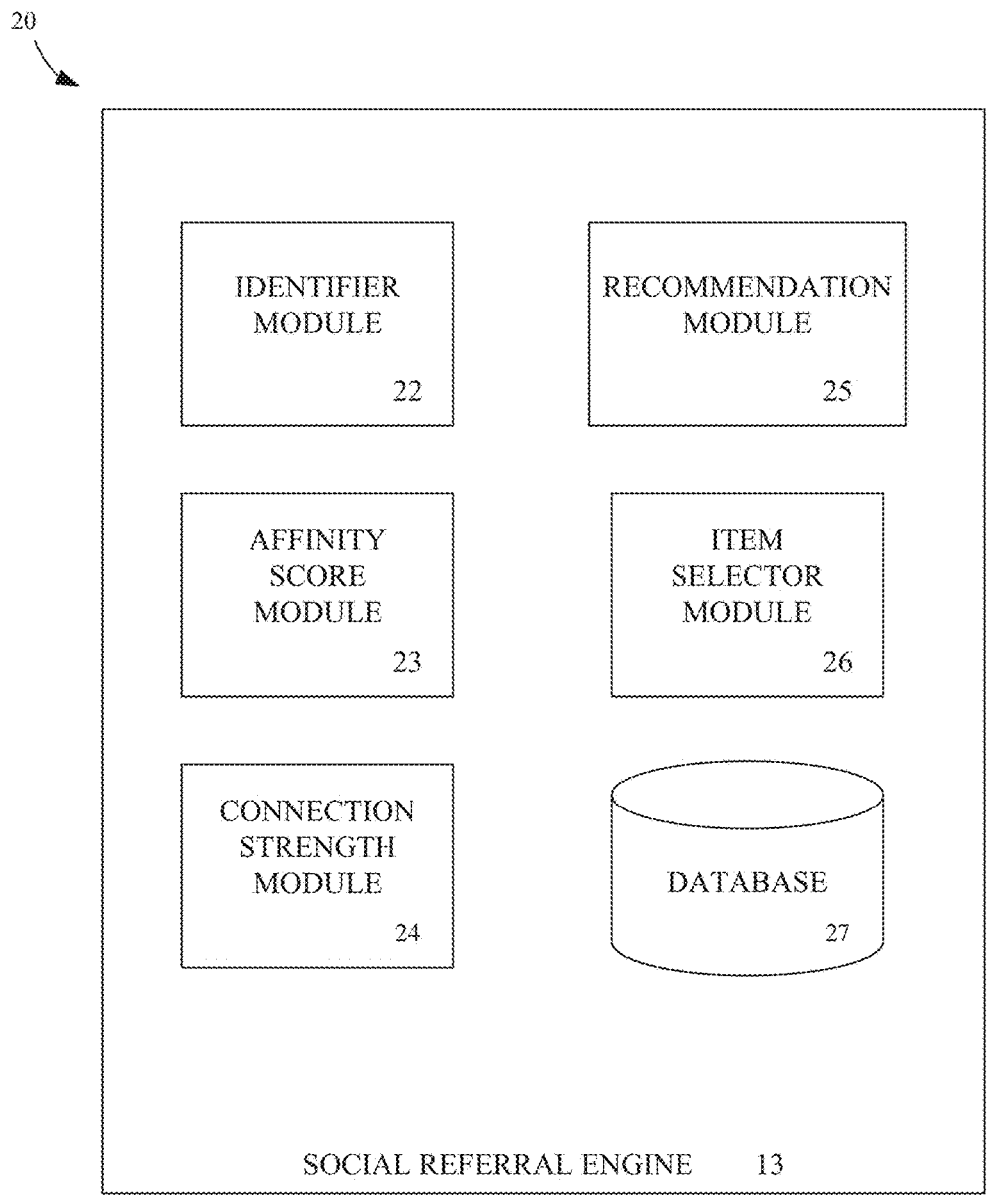
FIG. 2 is a block diagram of certain modules of an example system for delivering relevant recommendations, consistent with some example embodiments.

FIG. 2 is a block diagram of certain modules of an example system for delivering relevant recommendations, consistent with some example embodiments. Some or all of the modules of system 20 illustrated in FIG. 2 may be part of the social referral engine 13. As such, system 20 is described by way of example with reference to FIG. 1.

The system 20 is shown to include a number of modules that may be in communication with each other. One or more modules of the system 20 may reside on a server, client, or other processing device. One or more modules of the system 20 may be implemented or executed using one or more hardware processors. In some example embodiments, one or more of the depicted modules are implemented on a server of the social networking system 10. In FIG. 2, the social referral engine 13 is shown as including an identifier module 22, an affinity module 23, a connection strength module 24, a recommendation module 25, an item selector module 26, and a database 27 configured to communicate with each other (e.g., via a bus, shared memory, or a switch).

An identifier module 22 is configured to identify a recommender based on the recommender being a member of a social networking service who has interacted with an item of web-based content. The identifier module 22 is also configured to identify a recommendee based on the recommendee being another member of the social networking service who is connected to the recommender via a social graph maintained by the social networking service and based on having an affinity score for the item of web-based content that exceeds a recommendee affinity score threshold and a connection strength to the recommender that exceeds a connection strength threshold. In some example embodiments, these determinations are made using data such as member profile data 14, social graph data 18, or behavioral data 19 that may be stored in and retrieved from database 27.

Users of the social networking service may engage (e.g., interact) with items of web-based content in numerous ways. For example, the interaction with the item of web-based content may include purchasing an item of digital media (e.g., a song or a movie) online, joining a group hosted by the social networking service, sharing an article, commenting on a blog, following a business leader, watching a movie, attending an event (e.g., a webinar), etc. In some example embodiments, the user's history of viewing items of web-based content may be a source of data informative of the types of user interactions with the items of web-based content. The user history data, in some instances, may be part of the behavioral data that may be stored in and retrieved from database 27.

An affinity score module 23 is configured to calculate an affinity score of the potential recommendee for the item of web-based content. Data about the potential recommendee's interest in the item of web-based content (or the relevance of the item of web-based content to the potential recommendee), such as member profile data 14, social graph data 18, or behavioral data 19, may be used in the calculation of the recommendee affinity score. Once the recommendee affinity score is determined, the affinity score module 23 may compare the recommendee affinity score with a recommendee affinity score threshold. If the affinity score module 23 determines that the recommendee affinity score exceeds the recommendee affinity score threshold, a conclusion may be drawn that the item of web-based content is highly relevant to the recommendee. As such, based on having a high degree of interest in the item of web-based content, the potential recommendee may be considered more likely to engage with the item upon receiving a recommendation to interact with the item.

In certain example embodiments, the affinity score module 23 is further configured to determine whether the recommender has an affinity score for the item of web-based content that exceeds a recommender affinity score threshold. A recommender with a higher recommender affinity score for an item of web-based content may be perceived by the recipient of a recommendation to be more trustworthy (or his or her recommendation more reliable). For example, both the writer of an online article (an item of web-based content) and a person who comments on the article (e.g., a commentator) may be potential recommenders based on having interacted with the article by authoring and commenting on the article, respectively. However, the article writer may be assigned a higher recommender affinity score for the item of web-based content (the article) compared to the commentator based on, for example, being the author of the article, an expert on the topic of the article, number of articles written on the topic, the level of engagement with the commentators, etc. In certain example embodiments, the commentator may have a higher recommender affinity score for the article based on, for example, being an expert on the topic of the article.

To calculate the recommender affinity score, the affinity score module 23 may use data about the potential recommender's interest in the item of web-based content (or the relevance of the item of web-based content to the potential recommender), such as member profile data 14, social graph data 18, behavioral data 19, etc. Once the recommender affinity score is determined, the affinity score module 23 may compare the recommender affinity score with a recommender affinity score threshold. If the affinity score module 23 determines that the recommender affinity score exceeds the recommender affinity score threshold, a conclusion may be drawn that the item of web-based content is highly relevant to the recommender. As such, based on having a high degree of interest in the item of web-based content, the potential recommender may be considered more likely to send a recommendation to a recommendee upon receiving an invitation to do that and.

A connection strength module 24 is configured to calculate the strength of the connection between a potential recommender and a potential recommendee. A precursor to calculating the connection strength is determining that the potential recommender and the potential recommendee have some association with each other. However, for a recommendation to be "warm" (e.g., be favourably received by the recommendee), the recommendation has to originate from a sender who has a reasonably close connection to the recommendee. To that end, in some example embodiments, the connection strength between a potential recommender and a potential recommendee is calculated using a social graph (e.g., the potential recommender's social graph or the potential recommendee's social graph) maintained by the social networking service.

Consistent with some example embodiments, a social network service maintains a social graph, implemented as a graph data structure having nodes and edges, where the nodes represent different entities and the edges represent various associations or relationships between entities. For example, with some example embodiments, the entity types may include people. Accordingly, the edges that connect any two nodes (entities) represent types of associations between the entities, and will therefore depend in part on the entities involved. For example, an edge connecting two nodes that represent people may be representative of a specific type of relationship between the two people (e.g., a potential recommender and a potential recommendee), including a direct, bilateral connection between the two people. In addition to the edges having a particular type, representative of the nature of the relationship between two entities, each edge connecting two entities is assigned an edge score to reflect the strength, or relevance, of the particular association.

In some example embodiments, when a member of the social networking service performs a particular task in connection with an item of web-based content, the social referral engine 13 (e.g., specifically, the connection strength module 24) will perform an algorithmic process to analyse the social graph and to identify the connection paths that connect the recommender with other members of the social graph who have an affinity for the item. The connection strength module 24 may also determine the strengths of the connections between the recommender and the other members of the social graph. As a result, the other members who both have an affinity for the item and whose connection paths to the recommender are determined to be strongest are a subset of the set of all potential recommendees for the item to whom the respective recommender may send recommendations of the item.

Consistent with some embodiments, for each connection path connecting a recommender to a recommendee, a path score is derived to reflect the overall connection strength (or relevance) of the path connecting the user with the target. For example, with some embodiments, the path score is derived by simply aggregating (e.g., summing, or otherwise combining with an algorithm or formula) the individual edge scores that correspond with the edges connecting the nodes that ultimately connect the recommender to the recommendee. A variety of algorithms may be used to derive the individual edge scores for a particular edge and/or edge type connecting any two nodes in the social graph. For example, with some embodiments, various weighting factors may be applied to influence (e.g., increase or decrease) the edge score for a particular edge type (e.g., the type of association existing between two nodes in the social graph), based on the particular item for which the connection paths are being identified and presented. In any case, a recommendee may be identified once the various connection paths connecting a recommender to one or more recommendee(s) have been identified and ordered or ranked by path score and it has been determined that the item is highly relevant to the recommendee.

For example, in the context of group recommendations, the social referral system may periodically calculate the affinity score of a member for a group. This score may subsequently be used to recommend new groups for a member. The member can also share a group of which he or she is a member with his connections.

In some example embodiments, after the recommender joins a group, he or she may be prompted to recommend the group to a subset of members of his or her social graph. This subset of potential recommendees may be pre-determined by the system based on having at least a minimum level of affinity toward the group. In some example embodiments, the connection strength between the recommender and the recommendee may also be computed. Subsequently, each of the connections may receive a personal group recommendation message from the recommender.

Each (recommender, group) pair may have multiple recommendees to whom the group may be referred. However, the content of the group may not be equally relevant to all the recommendees. Analogously, the relationship between the recommender and the recommendee is also a salient attribute that contributes to the referral operation. In some example embodiments, the social referral system may suggest the recommendees with the highest connection strength in a recommender's social graph to be referred for a particular group. In another embodiment, the system could recommend the recommendees with the highest recommendee affinity score, or employ a hybrid approach. Since for each $(u_i, g_j)$ pair a subset, $\hat{N}$ of member $u_i$'s connections is obtained, two different ordered lists can be obtained from $\hat{N}$, i.e., $\pi_1 = ([\hat{u}_{11}, \hat{u}_{21}, \ldots, \hat{u}_{|\wedge N|1}])$, where $m < n \rightarrow \sigma(u_{ii}, \hat{u}_{m_1}) > \sigma(u_i, \hat{u}_{n_1})$ and $\pi_2 = (\hat{u}_{12}, \hat{u}_{22}, \ldots, \hat{u}_{|\wedge N|2})$, where $m < n \rightarrow \tau(\hat{u}_{m_2}, g_j) > \tau(\hat{i}_{m_2}, g_j)$. Here, $\sigma(u_i, \hat{u}_{m_1})$ stands for the connection strength between $u_i$ and $\hat{u}_{m_1}$. Subsequently, the top-k members may be targeted from either of the two lists.

Furthermore, for each recommender, there might be multiple groups he or she could refer to his or her network connections. Instead of flooding the recommender with candidates for all these groups, in some example embodiments, one group per recommender may be selected for which to suggest recommendees based on different criteria. One criterion is group quality. In some example embodiments, the quality of a group is generated as a function of recent activity pertaining to that group. The group quality score may be generated using the following equation:

$$Q(g_i) = [(1 + \ln(c + p))/(\ln(\alpha + N))],$$

where c, p, and N stand for the number of unique commenters, number of unique posters, and the total number of members in the group, and where $\alpha$ represents a user defined parameter. In some example embodiments, this measure is generated for all the active groups considering their recent activity. The parameter a smoothes out the effect of group size with respect to its activity.

In certain example embodiments, for each group, a set of potential recommendees [^N] is generated for a specific recommender:

$$R(u_i, g_j) = (\Sigma(u_k)/(|\hat{N}|)$$

where $\forall u_k \in \hat{N}$, $\sigma(u_i, u_k)$ represents the connections strength between $u_i$ and $u_k$. The measurement R depicts (or computes) the average connection strength between the recommender and recommendees. Thus, the selection of a group to be recommended may be based on R under the assumption that the stronger the connection strength between the recommender and the recommendee, the more likely the recommendee is to accept the recommendation.

In some embodiments, both scores may be used to select the group to recommend. A combination of these two measures, Q and R, may also be employed to compare performance:

$$RQ(u_i, g_j) = \ln(Q(g_j)) + \ln(R(u_i, g_j)),$$

where Q represents the group quality score in terms of its recent activity, R is the average connection strength score between the recommender and recommendees for a specific group, and RQ is a way of combining the group quality score and the average connection strength score to identify the most prominent group that the recommender should recommend.

Thus, for each recommender, the best group to be recommended may be identified based on the group quality score, the connection strength score, or a combination of scores. Also, the top-k potential recommendees may be selected from the recommender's connections.

A recommendation module 25 is configured to send a communication to the recommender that invites the recommender to recommend the item of web-based content to the recommendee. The communication may be sent, in some example embodiments, within a pre-determined time measured from the time the recommender initiated an interaction with the item. The communication to the recommender may, in some instances, be presented to the recommender as part of a user interface of a web-based messaging application for use by the recommender in composing an electronic message to the recommendee regarding a recommendation of the item.

In some example embodiments, the communication may invite the recommender to engage in an action that may cause a recommendation composed by the system on behalf of the recommender to be sent to the recommendee. For example, the system may send to the recommender an email message that includes a prepared recommendation and invites the recommender to forward the recommendation to a recommendee.

To assist the recommender understand how he or she is connected via the social graph to the recommendee, the communication to the recommender may include a visual representation of a connection path that illustrates an association between the recommender and recommendee. The path may include a plurality of nodes, including a node representing the recommender and a node representing the recommendee, and one or more edges, each edge connecting two nodes included in the path.

An item selector module 26 is configured to select the item of web-based content from a plurality of items of web-based content. The selection may be a function of interaction by one or more members of the social networking service with the item within a period of time.

Any two or more of these modules may be combined into a single module, and the functions described herein for a single module may be subdivided among multiple modules. Furthermore, according to certain example embodiments, the modules described herein as being implemented within a single machine, database, or device may be distributed across multiple machines, databases, or devices.

Figure 3:
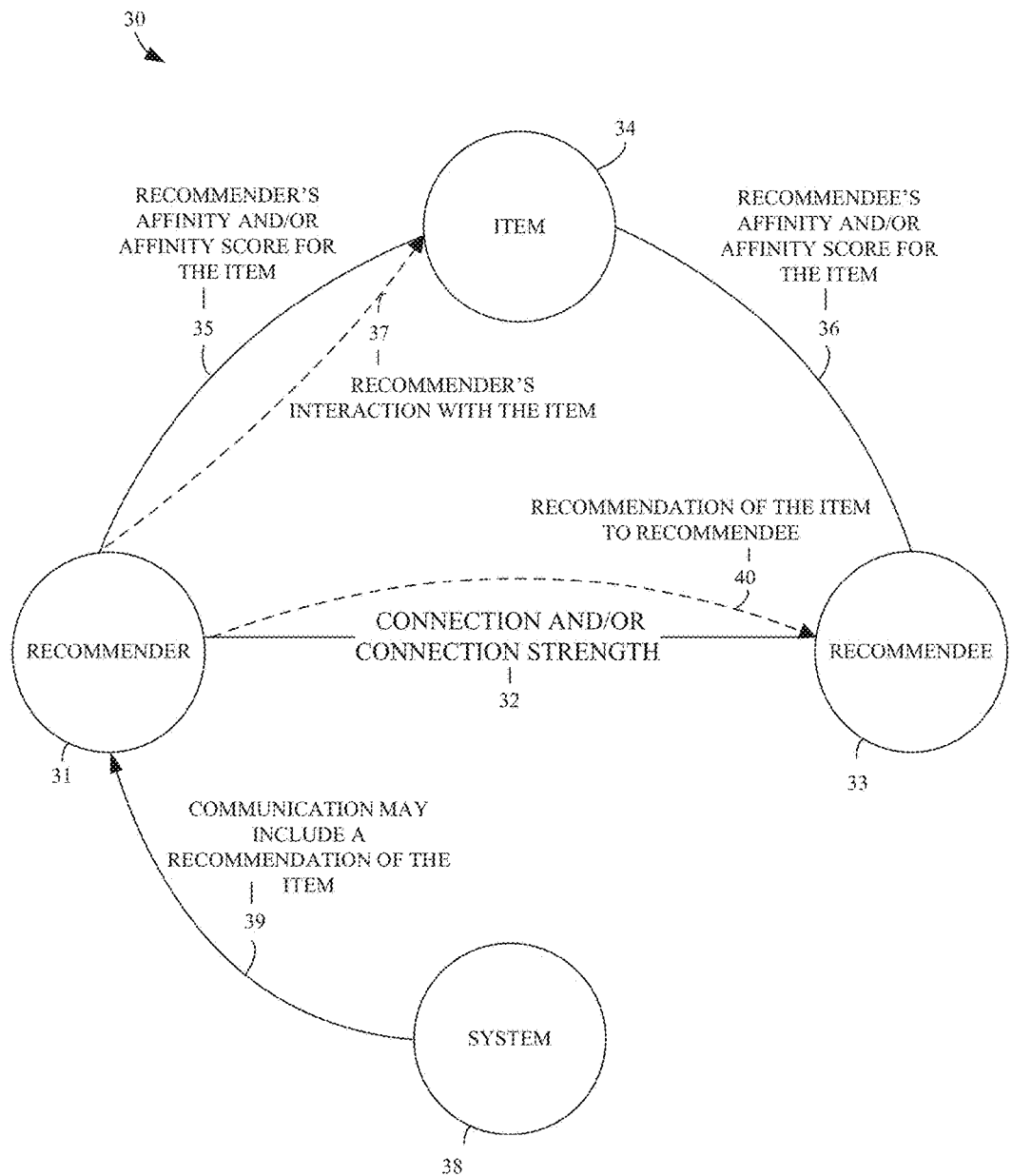
FIG. 3 is a block diagram illustrating the flow of data that occurs when performing various portions of a method for delivering relevant recommendations, consistent with some example embodiments.

FIG. 3 is a block diagram illustrating the flow of data that occurs when performing various portions of a method for delivering relevant recommendations, consistent with some example embodiments.

In some example embodiments, social referral system 38 may first select a particular item of web-based content 34 from a plurality of items of web-based content that may be the subject of a recommendation. Then, based on, for example, determining that a member of the social networking service interacted 37 with the selected item 34, the system 38 may identify the respective member as a potential recommender 31. In some example embodiments, a subsequent step may be to determine the recommender's degree of affinity 35 for the item 34. To that end, the system 38 may calculate a recommender's affinity score by examining the level (e.g., extent) or frequency of interaction 37 of the recommender 31 with the item 34. The system 38 may rank a number of potential recommenders 31 based on their recommender affinity scores in order to, for example, select the better recommenders for particular items 34. For example, if item 34 is a group and recommender 31 produces content for the group daily (e.g., by posting group relevant news), the recommender 31 affinity score 35 for the item 34 is higher as compared to another recommender 31 who only contributes content once a week. Thus, a recommender 31 who has a high recommender affinity score 35 for the item 34 may be perceived, for example, as more knowledgeable about the item 34 and, therefore, may make a more effective recommender. Moreover because a more active or more engaged contributor may have more incentive to draw attention to his contribution (e.g., to a group), he or she may be more willing to respond to the system 34's invitation to forward a recommendation to a recommendee.

In some example embodiments, alternately to or in addition to recommender affinity score ranking, the system 38 may compare the recommender affinity score with a pre-determined affinity score threshold to determine if a potential recommender 31 is a suitable recommender for the item 34. If the potential recommender 31 has a recommender affinity score 35 that exceeds the affinity score threshold, then the potential recommender 31 is considered a suitable recommender for the item 34.

In some example embodiments, the next step is to identify potential recommendees to whom the recommender 31 may refer the item 34. To establish whether the recommendee 33 is a suitable recommendee for recommender 31, the system 38 may analyse the recommender 31's social graph data in order to determine whether recommender 31 and recommendee 33 have an association 32. Upon determining that recommender 31 and recommendee 33 are connected 32 via a social graph, the system 38 may determine the strength of the connection 32 between the recommender 31 and recommendee 33. The connection strength 32 may be, in some instances, indicative of a degree of trust between the recommender 31 and recommendee 33. A higher degree of trust between the recommender 31 and recommendee 33 may be a factor in the recommendee 33 perceiving the recommendation of the item 34 as being a "warm" recommendation and following it.

In certain example embodiments, before identifying a person as a suitable recommendee, the system 38 may also determine if the item 34 is relevant to the potential recommendee 33. By facilitating the delivery of a recommendation whose subject matter is relevant to the recommendee 33, the system 38 may improve the chances of the recommendee 33 following the recommendation. As discussed above, the system 38 may determine whether the potential recommendee has any interest 36 in engaging with the item 34 by analysing the data available for the potential recommendee 33 (e.g., member profile data 14, social graph data 18, behavioral data 19, etc.) Upon determining that the potential recommendee 33 has an affinity 36 for the item 34, the system 38 may determine the recommendee 34's affinity score 36 for the item 34. To identify, for example, recommendees 33 who may be potentially more receptive to recommendations of the item 34, the system 33 may either compare each potential recommendee's affinity score 36 with a recommendee affinity score threshold, or rank the potential recommendees according to their recommendee affinity scores 36, or both. If, for instance, a recommendee 33 has a recommendee affinity score 36 that exceeds the recommendee affinity score threshold or ranks high on a recommendee affinity score scale as compared to other potential recommendees, the recommendee 33 may be considered suitable to be sent a recommendation of the item 34.

In some example embodiments, upon determining that the potential recommendee 33 has both a strong connection 32 to recommender 31 and a high degree of affinity for the item 34, the system 38 identifies the potential recommendee 33 as a recommendee to whom the recommender 31 may be invited 39 by the system 38 to recommend 40 the item 34. The system 38 may send a communication 39 (e.g., an email message) to the recommender 31 that invites the recommender 31 to recommend 40 the item 34 to the recommendee 33. In some example embodiments, the system 38 may send the communication 39 to the recommender 31 within a pre-determined time measured from the recommender 31 initiating an interaction with the item 34. This may help avoid the delivery of recommendations that are stale and, therefore, ineffective. The system 38, may, in some instances, include in the communication 39 a recommendation composed on behalf of the recommender 31 and may invite the recommender 31 to engage in an action that causes the recommendation to be sent to the recommendee (e.g., forward the recommendation). The communication 39 may also include a visual representation of the connection 32 between the recommender 31 and the recommendee 33 to help the recommender 31 understand the association between himself or herself and the recommendee 33.

Figure 4:
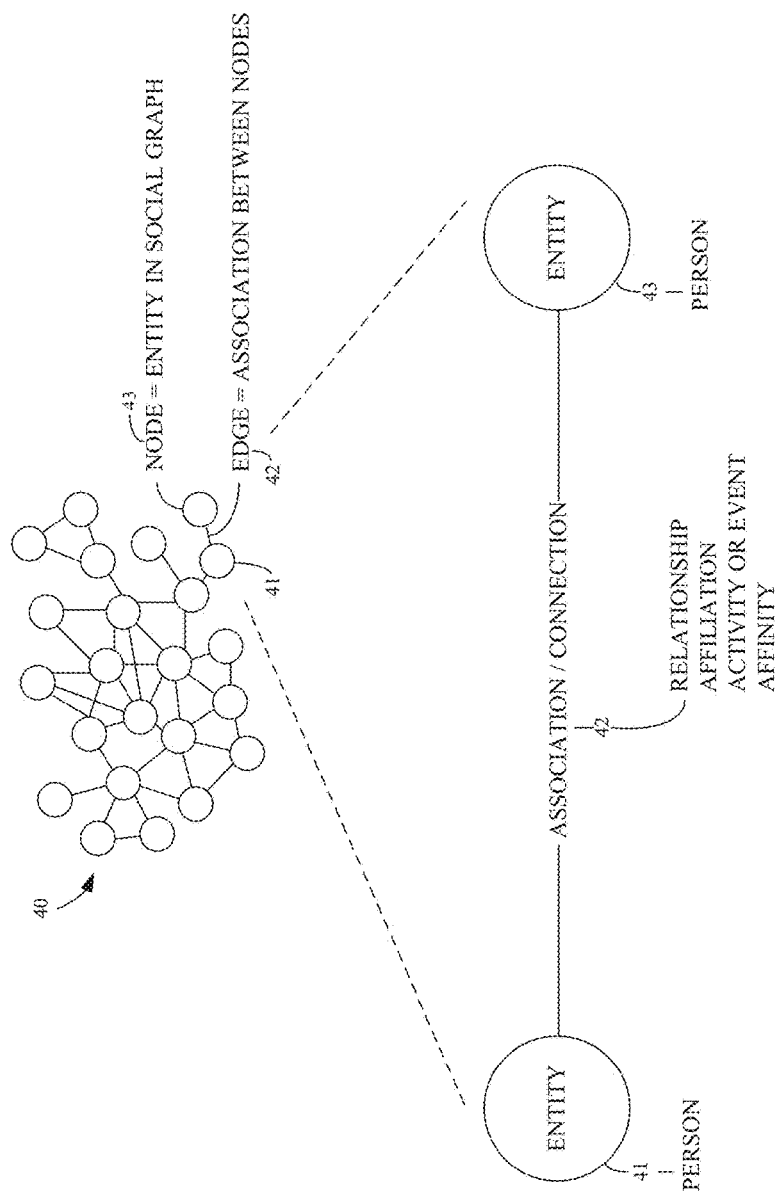
FIG. 4 is a block diagram illustrating an example of a portion of a graph data structure for modelling a social graph, consistent with some example embodiments.

FIG. 4 is a block diagram illustrating an example of a portion of a graph data structure 40 for implementing a social graph, according to some example embodiments. As illustrated in FIG. 4, the graph data structure 40 consists of nodes connected by edges. For instance, the node with reference number 41 is connected to the node with reference number 43 by means of the edge with reference number 42. Each node in the graph data structure represents an entity in the social graph (e.g., a person). The edges that connect any two nodes can represent a wide variety of different associations (e.g., connections). For example, in general, an edge may represent a relationship, an affiliation, an activity or event, or some other affinity shared between entity 41 (e.g., the recommender) and entity 43 (e.g., the recommendee).

Figure 5:
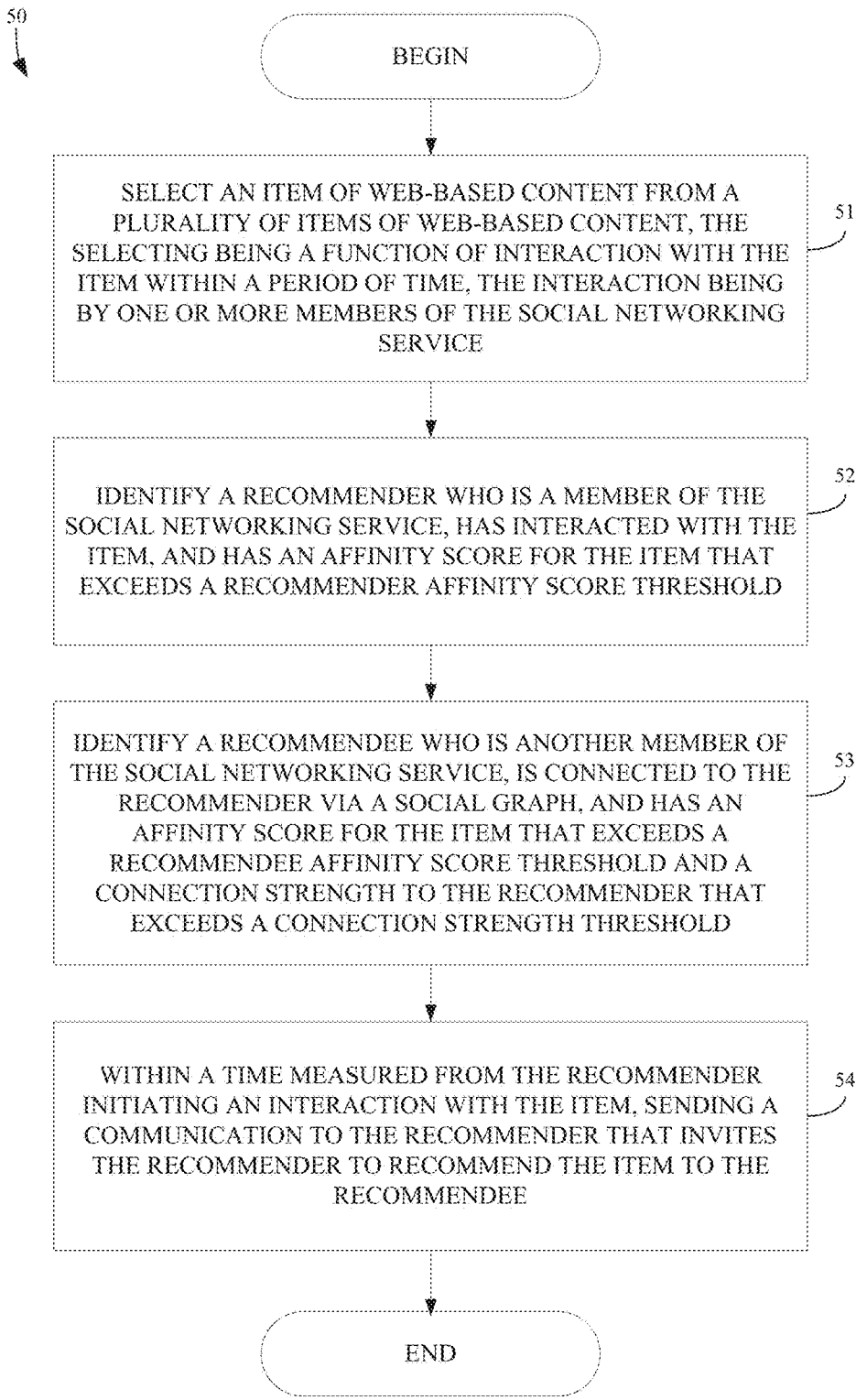
FIG. 5 is a flow diagram illustrating method steps involved in a method for delivering relevant recommendations, consistent with some example embodiments.

FIG. 5 is a flow diagram illustrating method operations involved in an example of a method 50 for leveraging a social graph to identify senders and recipients of relevant recommendations and to facilitate the delivery of the relevant recommendations from the senders to the recipients. The inventive subject matter is independent of any specific type of messaging application. For example, the social referral engine 13 may be used with an email application, an instant messaging (IM) application, a text or SMS (short message service) text messaging application, or certain telephone or voice communication systems to include any of a variety of voice over IP (VoIP) based services. Similarly, the inventive subject matter can be implemented for use with applications that use any of a variety of network or computing models, to include web-based applications, client-server applications, or even peer-to-peer applications. With some embodiments, the messaging application may be a service that is integrated with the social network service and, thus, hosted by the same entity that operates the social network service and the social referral engine 13. Alternately, the social referral engine 13 may be accessible (e.g., via an application programming interface, or API) to third-party applications that are hosted by entities other than the entity that operates the social network service.

Consistent with some example embodiments, the method begins at method operation 51, when the social referral engine 13 selects an item of web-based content from a plurality of items of web-based content. The selecting may be a function of one or more member of the social networking service interacting with the item within a period of time. With some embodiments, the item of web-based content may be monitored for activity by one or more members of the social networking service. In some example embodiments, the activities of the members of the social networking service may be tracked to identify potential items of web-based content for recommendation purposes.

Next, at method operation 52, the social referral engine 13 identifies a recommender who is a member of the social networking service, has interacted with the selected item, and has an affinity score for the item that exceeds a recommender affinity score threshold. In some example embodiments, instead or in addition to comparing the recommender affinity score with the recommender affinity score threshold, the social referral engine 13 ranks the members who interacted with the selected item according to their recommender affinity scores. In certain example embodiments, the social referral engine 13 identifies a recommender without the recommender affinity score being a factor. Different data, such as member profile data 14, social graph data 18, or behavioral data 19, may be used to derive the recommender affinity score for the item.

At method operation 53, the social referral engine 13 identifies a recommendee who is another member of the social networking service, is connected to the recommender via a social graph, and has an affinity score for the item that exceeds a recommendee affinity score threshold and a connection strength to the recommender that exceeds a connection strength threshold. In some example embodiments, deriving the connection strength for the recommender-recommendee connection includes first identifying an appropriate algorithm or process for use in calculating the connection strength. Next, deriving the connection strength includes aggregating or combining in some manner the individual edge scores assigned to the individual edges that form the connection path in the social graph. In certain example embodiments, the selected algorithm or process may apply various weighting factors to different edge types to adjust (e.g., increase or decrease) the impact that a particular edge type has on a connection strength.

Next, at method operation 54, within a time measured from the time the recommender initiated an interaction with the item, the social referral engine 13 sends a communication to the recommender that invites the recommender to recommend the item to the recommendee. The communication to the recommender may, for example, be an email message. The communication may, in some example embodiments, include a visual representation of at least one connection path connecting the recommender to the potential recommendee. In some instances, the recommender may be presented a plurality of potential recommendees and given the option to select the recommendee(s) to whom to refer the item. With some example embodiments, a recommendation may be drafted on behalf of the recommender and may be automatically embedded within the content of the communication sent to the recommender. In certain example embodiments, a portion of automatically generated text (e.g., that may be included in the sent recommendation) may be embedded or otherwise included within a text box where the recommender may customize the recommendation for a particular recommendee. Accordingly, the recommender may edit the automatically embedded text prior to sending the recommendation to the recommendee.

The various operations of the example methods described herein may be performed, at least partially, by one or more processors that are temporarily configured (e.g., by software instructions) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 6:
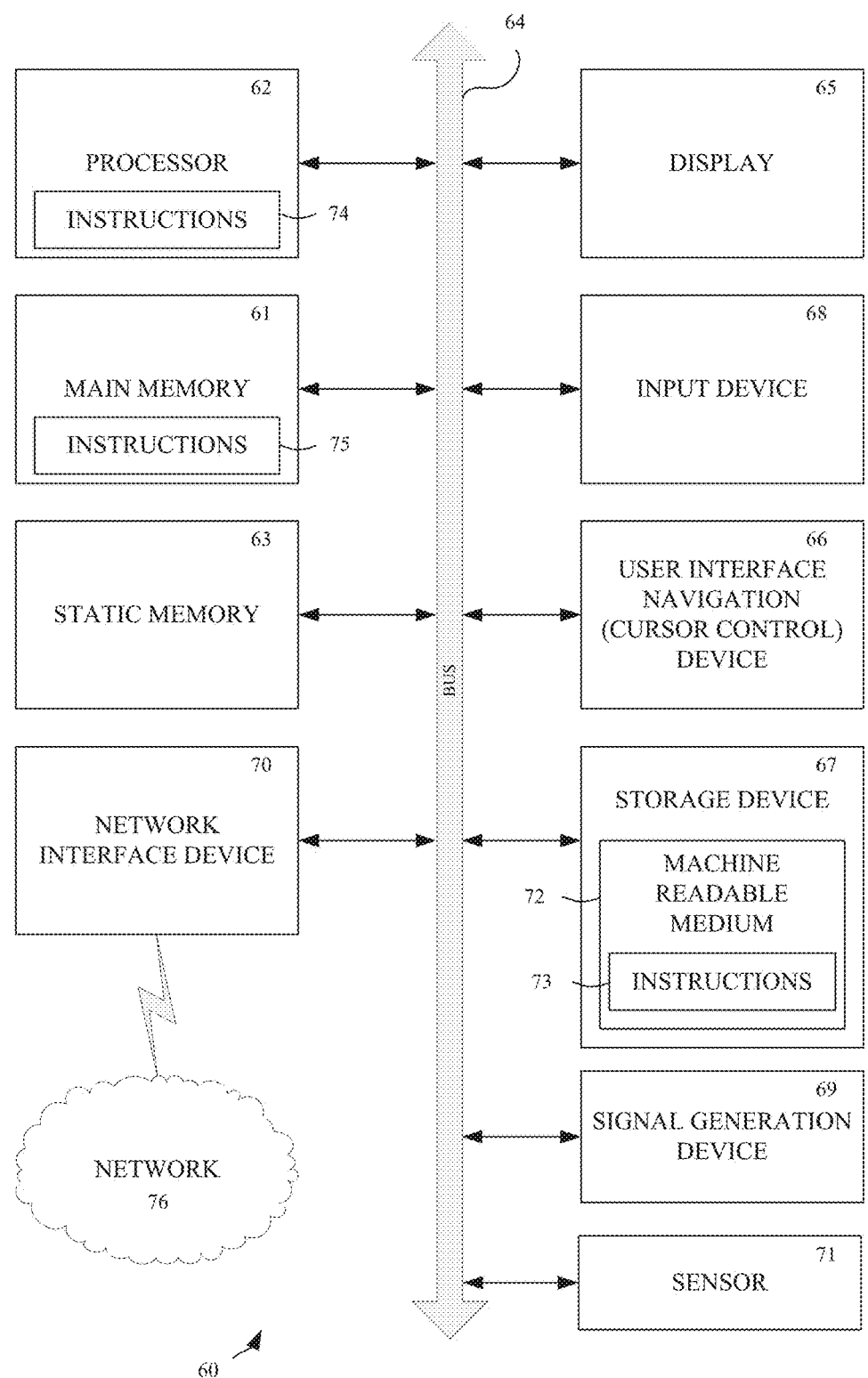
FIG. 6 is a block diagram of a machine in the example form of a computing device within which a set of instructions, for causing the machine to perform any one or more of the methodologies discussed herein, may be executed.

FIG. 6 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 60 includes a processor 62 (e.g., a central processing unit (CPU), a graphics processing unit (GPU) or both), a main memory 61, and a static memory 63, which communicate with each other via a bus 64. The computer system 60 may further include a display unit 65, an alphanumeric input device 68 (e.g., a keyboard), and a user interface (UI) navigation device 66 (e.g., a mouse). In some example embodiments, the display, input device, and cursor control device are a touch screen display. The computer system 60 may additionally include a storage device 67 (e.g., drive unit), a signal generation device 69 (e.g., a speaker), a network interface device 70, and one or more sensors 71, such as a global positioning system sensor, compass, accelerometer, or other sensor.

The drive unit 67 includes a machine-readable medium 72 on which is stored one or more sets of instructions and data structures (e.g., software 73) embodying or utilized by any one or more of the methodologies or functions described herein. The software 73 may also reside, completely or at least partially, within the main memory 61 and/or within the processor 62 during execution thereof by the computer system 60, the main memory 61 and the processor 62 also constituting machine-readable media.

While the machine-readable medium 72 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding, or carrying instructions for execution by the machine, and that cause the machine to perform any one or more of the methodologies of the present invention, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 73 may further be transmitted or received over a communications network 76 using a transmission medium via the network interface device 70 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding, or carrying instructions for execution by the machine, and includes digital or analog communications signals or other intangible medium to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:
    selecting, using one or more hardware processors of a computer system, an item of web-based content from a plurality of items of web-based content identified in one or more records of a database, the selecting being based on a number of interactions, by one or more members of a social networking service (SNS), with the item of web-based content within a period of time, and based on one or more affinity scores that represent an affinity of one or more members of the SNS towards the item of web-based content, an affinity score being determined based on matching a characteristic of member profile data of a member of the SNS and a topic included in the item of web-based content, and based on determining a level of expertise of the member with respect to the topic included in the item of web-based content;

identifying, using one or more hardware processors, an identifier of a recommender based on a database record that identifies the recommender as being a member of the SNS who has interacted with the item of web-based content via a client device associated with the recommender;

identifying, using the one or more hardware processors, an identifier of a recommendee based on a database record that identifies the recommendee as being another member of the SNS who is connected to the recommender via a social graph maintained by the SNS in a database, and based on the identifier of the recommendee being associated with an affinity score for the item of web-based content that exceeds a recommendee affinity score threshold value and with a connection strength score to the recommender that exceeds a connection strength threshold value; and transmitting, within a pre-determined time measured from the recommender initiating an interaction with the item of web-based content, a communication to the client device associated with the recommender, the communication including an invitation for the recommender to recommend the item to the recommendee, the transmitting performed using the one or more hardware processors.

2. The method of claim 1, wherein the identifying the recommender includes determining that the recommender has an affinity score for the item that exceeds a recommender affinity score threshold value.

3. The method of claim 1, wherein the interaction with the item includes a purchase transaction for the item.

4. The method of claim 1, wherein the interaction with the item includes joining a group hosted by the SNS.

5. The method of claim 1, wherein the interaction with the item includes at least one of sharing, commenting on, following, watching, listening, or attending.

6. The method of claim 1, wherein the communication to the recommender is presented as part of a user interface of a web-based messaging application for use by the recommender in composing an electronic message to the recommendee regarding a recommendation of the item.

7. The method of claim 1, wherein the communication invites the recommender to engage in an action that causes a recommendation composed on behalf of the recommender to be sent to the recommendee.

8. The method of claim 1, wherein the communication to the recommender includes a visual representation of a connection path that illustrates an association between the recommender and the recommendee, the path including a plurality of nodes, including a node representing the recommender and a node representing the recommendee, and one or more edges, each edge connecting two nodes included in the path.

9. A method to facilitate a recommendation of a group, the method comprising:

selecting, using one or more hardware processors of a computer system, the group from a plurality of groups that are hosted by a social networking service (SNS) and that are identified in one or more records of a database, the selecting of the group being based on a group quality value generated as a function of activity pertaining to the group by a total number of members in the group within a period of time, the group quality value being enhanced by at least one of a number of unique commenters or a number of unique posters, the selecting of the group being further based on one or more affinity scores that represent an affinity of one or more members of the SNS towards the group, an affinity score being determined based on member profile data of a member of the SNS and a characteristic of the group;

identifying, using one or more hardware processors, an identifier of a recommender based on a database record that identifies the recommender as being a member of the group who has initiated an action shared with the group via a client device associated with the recommender;

identifying, using the one or more hardware processors, an identifier of a recommendee based on a database record that identifies the recommendee as being a member of the SNS who is connected to the recommender via a social graph maintained by the SNS in a database, and based on the identifier of the recommendee being associated with an affinity score for the group that exceeds a recommendee affinity score threshold value and with a connection strength score to the recommender that exceeds a connection strength threshold value; and transmitting, within a pre-determined time measured from the recommender initiating the action shared with the group, a communication to the client device associated with the recommender, the communication including an invitation for the recommender to recommend that the recommendee joins the group, the transmitting performed using the one or more hardware processors.

10. A method to facilitate a recommendation, the method comprising:

selecting, using one or more hardware processors of a computer system, an item of web-based content from a plurality of items of web-based content identified in one or more records of a database, the selecting being based on a number of interactions, by one or more members of a social networking service (SNS), with the item of web-based content within a period of time, and based on one or more affinity scores that represent an affinity of one or more members of the SNS towards the item of web-based content, an affinity score being determined based on matching a characteristic of member profile data of a member of the SNS and a topic included in the item of web-based content, and based on determining a level of expertise of the member with respect to the topic included in the item of web-based content;

identifying, using one or more hardware processors, an identifier of a recommendee based on a database record that identifies the recommendee as being associated with an affinity score for the item of web-based content that exceeds a recommendee affinity score threshold value;

identifying, using the one or more hardware processors, an identifier of a recommender based on a database record that identifies the recommender as being a member of the SNS who is connected to the recommendee via a social graph maintained by the SNS in a database, based on the database record indicating that the recommender interacted with the item via a client device associated with the recommender, and based on the identifier of the recommender being associated with a connection strength score to the recommendee that exceeds a connection strength threshold value; and transmitting, within a pre-determined time measured from the recommender initiating an interaction with the item of web-based content, a communication to the client device associated with the recommender, the communication including an invitation for the recommender to recommend the item to the recommendee, the transmitting performed using the one or more hardware processors.

11. A system to facilitate a recommendation, the system comprising:
one or more hardware processors of a computer system; and
a non-transitory machine-readable medium for storing instructions that, when executed by the one or more hardware processors, cause the one or more hardware processors to perform operations comprising:
selecting an item of web-based content from a plurality of items of web-based content identified in one or more records of a database, the selecting being based on a number of interactions, by one or more members of a social networking service (SNS), with the item of web-based content within a period of time, and based on one or more affinity scores that represent an affinity of one or more members of the SNS towards the item of web-based content, an affinity score being determined based on matching a characteristic of member profile data of a member of the SNS and a topic included in the item of web-based content, and based on determining a level of expertise of the member with respect to the topic included in the item of web-based content;
identifying an identifier of a recommender based on a database record that identifies the recommender as being a member of the SNS who has interacted with the item of web-based content via a client device associated with the recommender;
identifying an identifier of a recommendee based on a database record that identifies the recommendee as being another member of the SNS who is connected to the recommender via a social graph maintained by the SNS in a database, and based on the identifier of the recommendee being associated with an affinity score for the item of web-based content that exceeds a recommendee affinity score threshold value and with a connection strength score to the recommender that exceeds a connection strength threshold value; and
transmitting, within a pre-determined time measured from the recommender initiating an interaction with the item of web-based content, a communication to the client device associated with the recommender, the communication including an invitation for the recommender to recommend the item to the recommendee, the transmitting performed using the one or more hardware processors.

12. The system of claim 11, wherein the operations further comprise:
determining that the affinity score of the recommendee for the item of web-based content exceeds the recommendee affinity score threshold value; and
determining that the recommender has an affinity score for the item web-based content that exceeds a recommender affinity score threshold value.

13. The system of claim 11, wherein the interaction with the item includes a purchase transaction for the item.

14. The system of claim 11, wherein the interaction with the item includes joining a group hosted by the SNS.

15. The system of claim 11, wherein the interaction with the item includes at least one of sliming, commenting on, following, watching, listening, or attending.

16. The system of claim 11, wherein the communication to the recommender is presented as part of a user interface of a web-based messaging application for use by the recommender in composing an electronic message to the recommendee regarding a recommendation of the item.

17. The system of claim 11, wherein the communication invites the recommender to engage in an action that causes a recommendation composed on behalf of the recommender to be sent to the recommendee.

18. The system of claim 11, wherein the communication to the recommender includes a visual representation of a connection path that illustrates an association between the recommender and recommendee, the path including a plurality of nodes, including a node representing the recommender and a node representing the recommendee, and one or more edges, each edge connecting two nodes included in the path.

19. A system to facilitate a recommendation of a group, the system comprising:
one or more hardware processors of a computer system; and
a non-transitory machine-readable medium for storing instructions that, when executed by e one or more hardware processors, cause the one or more hardware processors to perform operations comprising:
selecting the group from a plurality of groups that are hosted by a social networking service (SNS) and that are identified in one or more records of a database, the selecting of the group being based on a group quality value generated as a function of activity pertaining to the group by a total number of members in the group within a period of time, the group quality value being enhanced by at least one of a number of unique commenters or a number of unique posters, the selecting of the group being further based on one or more affinity scores that represent an affinity of one or more members of the SNS towards the group, an affinity score being determined based on member profile data of a member of the SNS and a characteristic of the group;
identifying an identifier of a recommender based on a database record that identifies the recommender as being a member of the group who has initiated an action shared with the group via a client device associated with the recommender;
identifying an identifier of a recommendee based on a database record that identifies the recommendee as being a member of the SNS who is connected to the recommender via a social graph maintained by the SNS in a database, and based on the identifier of the recommendee being associated with an affinity score for the group that exceeds a recommendee affinity score threshold value and with a connection strength score to the recommender that exceeds a connection strength threshold value; and
transmitting, within a pre-determined time measured from the recommender initiating the action shared with the group, a communication to the client device associated with the recommender, the communication including an invitation for the recommender to recommend that the recommendee joins the group, the transmitting performed using the one or more hardware processors.

20. A system to facilitate a recommendation, the system comprising:
one or more hardware processors; and
a non-transitory machine-readable medium for storing instructions that when executed by the one or more hardware processors, cause the one or more hardware processors to perform operations comprising:
selecting an item of web-based content from a plurality of items of web-based content identified in one or more records of a database, the selecting being based on a number of interactions, by one or more members of a social networking service (SNS), with the item of web-based content within a period of time, and based on one or more affinity scores that represent an affinity of one or more members of the SNS towards the item of web-based content, an affinity score being determined based on matching a characteristic of member profile data of a member of the SNS and a topic included in the item of web-based content, and based on determining a level of expertise of the member with respect to the topic included in the item of web-based content;
identifying an identifier of a recommendee based on a database record that identifies the recommendee as being associated with an affinity score for the item of web-based content that exceeds a recommendee affinity score threshold value;
identifying an identifier of a recommender based on a database record that identifies the recommender as being a member of the SNS who is connected to the recommendee via a social graph maintained by the SNS in a database, based on the database record indicating that the recommender interacted with the item via a client device associated with the recommender, and based on the identifier of the recommender being associated with a connection strength score to the recommendee that exceeds a connection strength threshold value; and
transmitting, within a pre-determined time measured from the recommender initiating an interaction with the item of web-based content, a communication to the client device associated with the recommender, the communication including an invitation for the recommender to recommend the item to the recommendee, the transmitting performed using the one or more hardware processors.

* * * * *

UNITED STATES PATENT AND TRADEMARK OFFICE
CERTIFICATE OF CORRECTION

PATENT NO. : 10,380,629 B2
APPLICATION NO. : 13/889991
DATED : August 13, 2019
INVENTOR(S) : Amin et al.

Page 1 of 1

It is certified that error appears in the above-identified patent and that said Letters Patent is hereby corrected as shown below:

In the Claims

In Column 25, Line 64, in Claim 12, after "item", insert --of--

In Column 26, Line 4, in Claim 15, delete "sliming," and insert --sharing,-- therefor In Column 26, Line 28, in Claim 19, delete "e one" and insert --the one-- therefor Signed and Sealed this
Third Day of March, 2020

Andrei Iancu
*Director of the United States Patent and Trademark Office*